(12) United States Patent
Watanabe et al.

(10) Patent No.: US 12,103,488 B2
(45) Date of Patent: Oct. 1, 2024

(54) ANCHOR DEVICE

(71) Applicant: KABUSHIKI KAISHA TOKAI-RIKA-DENKI-SEISAKUSHO, Aichi (JP)

(72) Inventors: Yuki Watanabe, Aichi (JP); Yusuke Hirokawa, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 399 days.

(21) Appl. No.: 17/434,595

(22) PCT Filed: Mar. 16, 2020

(86) PCT No.: PCT/JP2020/011527
§ 371 (c)(1),
(2) Date: Aug. 27, 2021

(87) PCT Pub. No.: WO2020/189639
PCT Pub. Date: Sep. 24, 2020

(65) Prior Publication Data
US 2022/0134993 A1    May 5, 2022

(30) Foreign Application Priority Data

Mar. 20, 2019  (JP) ................................ 2019-053425

(51) Int. Cl.
*B60R 22/18*    (2006.01)
(52) U.S. Cl.
CPC .................................... *B60R 22/18* (2013.01)

(58) Field of Classification Search
CPC ..................................................... B60R 22/24
See application file for complete search history.

(56) References Cited

U.S. PATENT DOCUMENTS

| | | | |
|---|---|---|---|
| 2021/0078526 A1 * | 3/2021 | Watanabe | .............. A44B 11/25 |
| 2021/0339701 A1 * | 11/2021 | Watanabe | .............. B60R 22/18 |

FOREIGN PATENT DOCUMENTS

| | | | | |
|---|---|---|---|---|
| DE | 102019113310 A1 * | 11/2019 | | ............. B60R 22/24 |
| EP | 1557326 A1 * | 7/2005 | | ............. B60R 22/18 |
| EP | 1798122 A1 * | 6/2007 | | ............. B60R 22/18 |
| JP | 2013005833 A * | 1/2013 | | |
| JP | 2018-127031 A | 8/2018 | | |
| JP | 2019006204 A * | 1/2019 | | |
| JP | 2019048561 A * | 3/2019 | | |
| JP | 2020093651 A * | 6/2020 | | |
| JP | 2020093769 A * | 6/2020 | | |
| JP | 2020152271 A * | 9/2020 | | ............. B60R 22/18 |
| JP | 2020158107 A * | 10/2020 | | |

(Continued)

*Primary Examiner* — Nicole T Verley
(74) *Attorney, Agent, or Firm* — Studebaker & Brackett PC (57) ABSTRACT

In an anchor device, a communication hole in which a webbing pass-through portion and a pin insertion portion communicate with each other is provided at a plate, a webbing passed through the webbing pass-through portion is coupled to the plate, and a mounting pin is inserted into the pin insertion portion. Here, a narrowing portion of the plate narrows the width of communication between the webbing pass-through portion and the pin insertion portion. For this reason, the mounting pin can be inhibited from contacting the webbing when the mounting pin is inserted into the pin insertion portion.

5 Claims, 5 Drawing Sheets

(56) References Cited

FOREIGN PATENT DOCUMENTS

| | | | | |
|---|---|---|---|---|
| JP | 2021041902 A | * | 3/2021 | ............ A44B 11/25 |
| JP | 2021070436 A | * | 5/2021 | |
| JP | 2021172304 A | * | 11/2021 | |
| JP | 2021175637 A | * | 11/2021 | ............ B60R 22/24 |
| JP | 2023021397 A | * | 2/2023 | |
| JP | 2023112206 A | * | 8/2023 | |
| WO | WO-0142063 A1 | * | 6/2001 | ............ B60R 22/18 |
| WO | WO-2020121712 A1 | * | 6/2020 | |
| WO | WO-2020189639 A1 | * | 9/2020 | ............ B60R 22/18 |
| WO | WO-2020189640 A1 | * | 9/2020 | |

* cited by examiner

ANCHOR DEVICE

CROSS-REFERENCE TO RELATED APPLICATIONS

The present application is a U.S. National Phase of PCT/JP2020/011527 filed on Mar. 16, 2020, claiming priority under 35 USC 119 from Japanese Patent Application No. 2019-053425 filed Mar. 20, 2019, the disclosure of which is incorporated by reference herein.

TECHNICAL FIELD

This invention relates to an anchor device that couples together a webbing and a vehicle body.

BACKGROUND ART

The anchor plate of JP-A No. 2018-127031 has a plate body and a spring plate, and a seat belt webbing is passed through an opening in the plate body.

Furthermore, the opening in the plate body is formed by a large hole portion into which a bolt is inserted and a fine hole portion that is continuous with the large hole portion and in which the bolt is disposed, and when the bolt is disposed in the fine hole portion of the plate body, movement toward the large hole portion is blocked by a tie portion of the spring plate.

SUMMARY OF INVENTION

Technical Problem

In this connection, it is preferred that the bolt not contact the seat belt webbing passed through the opening in the plate body.

The present invention has been made in view of the above circumstances, and it is an object thereof to provide an anchor device that can inhibit a second member from contacting a webbing.

Solution to Problem

An anchor device of a first aspect in the invention for achieving the above object includes: a first member through which is formed a communication hole in which a webbing pass-through portion and an insertion portion communicate with each other, the first member being coupled to a webbing passed through the webbing pass-through portion; a second member that is coupled to a vehicle body side and is inserted into the insertion portion and penetrates the first member; and a limiting portion that is provided between the webbing pass-through portion and the insertion portion and limits the second member and the webbing from moving toward each other.

An anchor device of a second aspect is the anchor device of the first aspect, wherein the limiting portion includes a narrowing portion that narrows the width of communication between the webbing pass-through portion and the insertion portion in the communication hole.

An anchor device of a third aspect is the anchor device of the second aspect, wherein the narrowing portion includes a pair of projections that project into the communication hole toward each other.

An anchor device of a fourth aspect is the anchor device of any one of the first to third aspects, wherein the limiting portion includes a limiting wall disposed at the insertion direction side of the second member between the webbing pass-through portion and the insertion portion of the first member.

An anchor device of a fifth aspect is the anchor device of any one of the first to fourth aspects, further including a biasing member that is mounted on the first member and biases the second member so that the second member is held in the first member.

An anchor device of a sixth aspect is the anchor device of the fifth aspect, wherein the limiting portion is provided at the biasing member.

An anchor device of a seventh aspect is the anchor device of the sixth aspect, wherein the distance between the limiting portion and the first member is reduced as a result of the biasing member biasing the second member.

Advantageous Effects of Invention

In the anchor device of the first aspect in the invention, the communication hole in which the webbing pass-through portion and the insertion portion communicate with each other is formed through the first member, and the first member is coupled to the webbing passed through the webbing pass-through portion. Furthermore, the second member is coupled to the vehicle body, and is inserted into the insertion portion and penetrates the first member.

Here, the limiting portion is provided between the webbing pass-through portion and the insertion portion, and the limiting portion limits the second member and the webbing from moving toward each other. Because of this, the second member and the webbing can be limited by the limiting portion from contacting each other.

In the anchor device of the second aspect, the narrowing portion of the limiting portion narrows the width of communication between the webbing pass-through portion and the insertion portion in the communication hole. Because of this, the second member and the webbing can be limited from contacting each other.

In the anchor device of the third aspect, the pair of projections of the narrowing portion project into the communication hole toward each other. Because of this, the second member and the webbing can be effectively inhibited from contacting each other.

In the anchor device of the fourth aspect, the limiting wall of the limiting portion is disposed at the insertion direction side of the second member of the first member between the webbing pass-through portion and the insertion portion. Because of this, the second member and the webbing can be limited from contacting each other.

In the anchor device of the fifth aspect, the biasing member is mounted on the first member, and the biasing member biases the second member to hold the second member in the first member. Because of this, the second member can be held in the first member.

In the anchor device of the sixth aspect, the limiting portion is provided at the biasing member. Because of this, the limiting portion can be easily provided.

In the anchor device of the seventh aspect, the biasing member biases the second member, and the distance between the limiting portion and the first member is reduced. Because of this, the webbing can be inhibited from getting caught between the first member and the limiting portion.

BRIEF DESCRIPTION OF DRAWINGS

FIG. 3(1) is a front view of the anchor device, FIG. 3(2) is a side view of the anchor device, FIG. 3(3) is a sectional view taken along line 3C-3C of FIG. 3(1), and FIG. 3(4) is the same sectional as FIG. 3(3) and shows a state in which a mounting pin is inserted into a pin insertion portion.

DESCRIPTION OF EMBODIMENT

An embodiment of the invention will be described in detail below with reference to the drawings.

Figure 1:
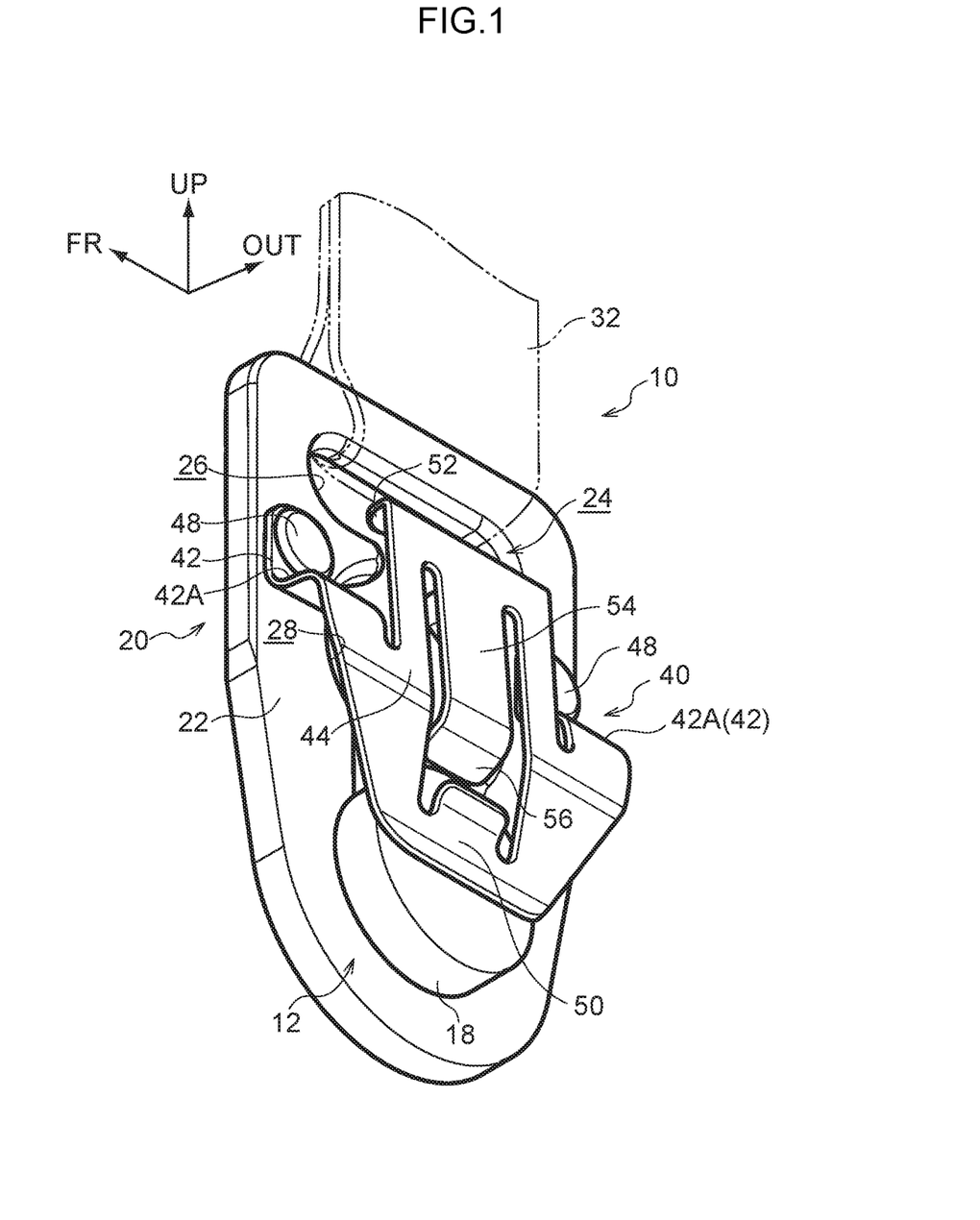
FIG. 1 is a perspective view of an anchor device pertaining to an embodiment in the invention.

In this embodiment, an anchor device 10 is described as being applied to a seat belt device for a front seat in a vehicle. In FIG. 1 the anchor device 10 pertaining to this embodiment is shown in a perspective view, and in FIG. 2 the anchor device 10 is shown in an exploded perspective view. It will be noted that in the drawings arrow FR indicates a forward direction of the vehicle to which the anchor device 10 is applied, arrow OUT indicates an outward direction in the vehicle width direction, and arrow UP indicates an upward direction.

Figure 2:
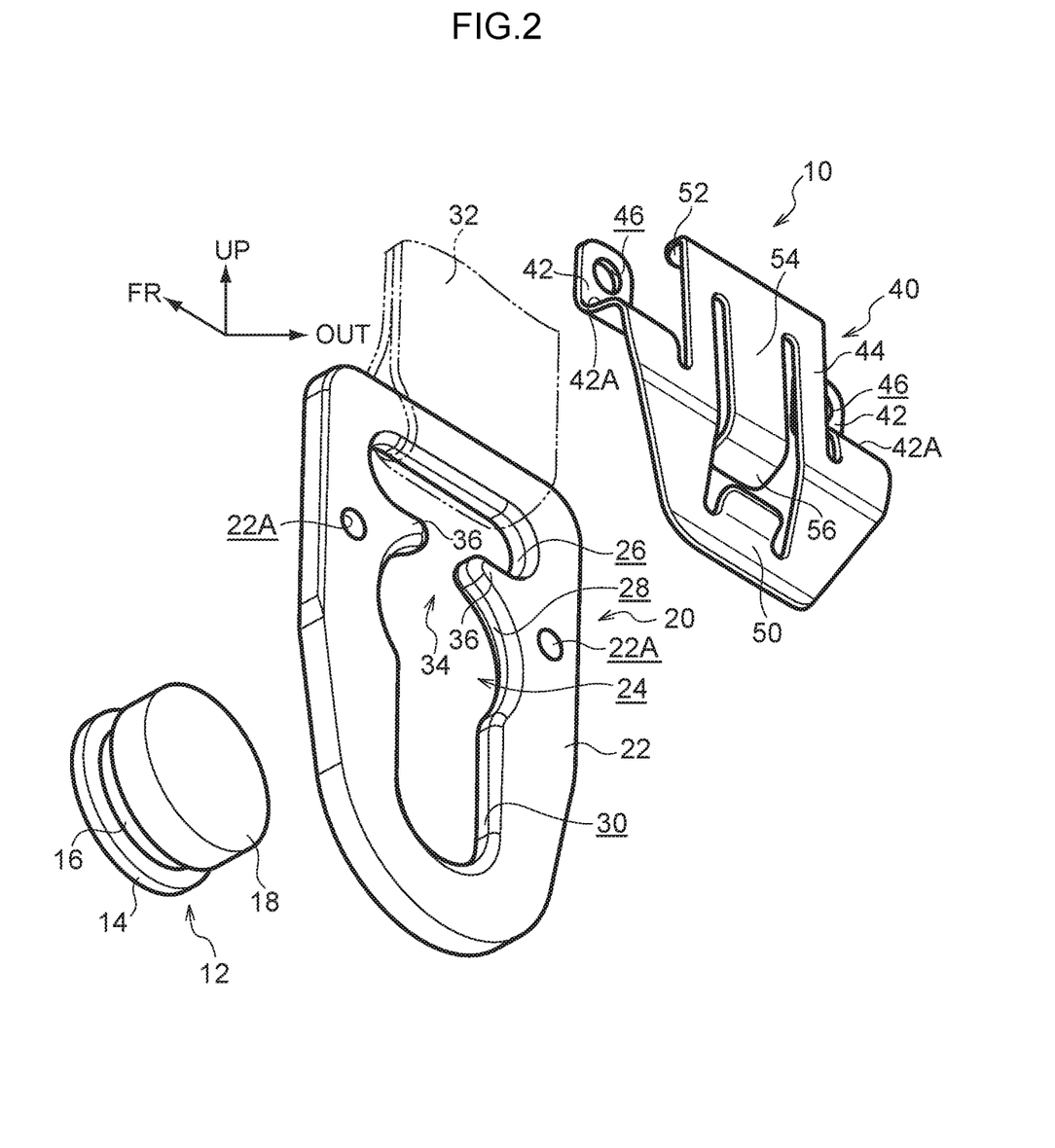
FIG. 2 is an exploded perspective view of the anchor device.
Figure 3:
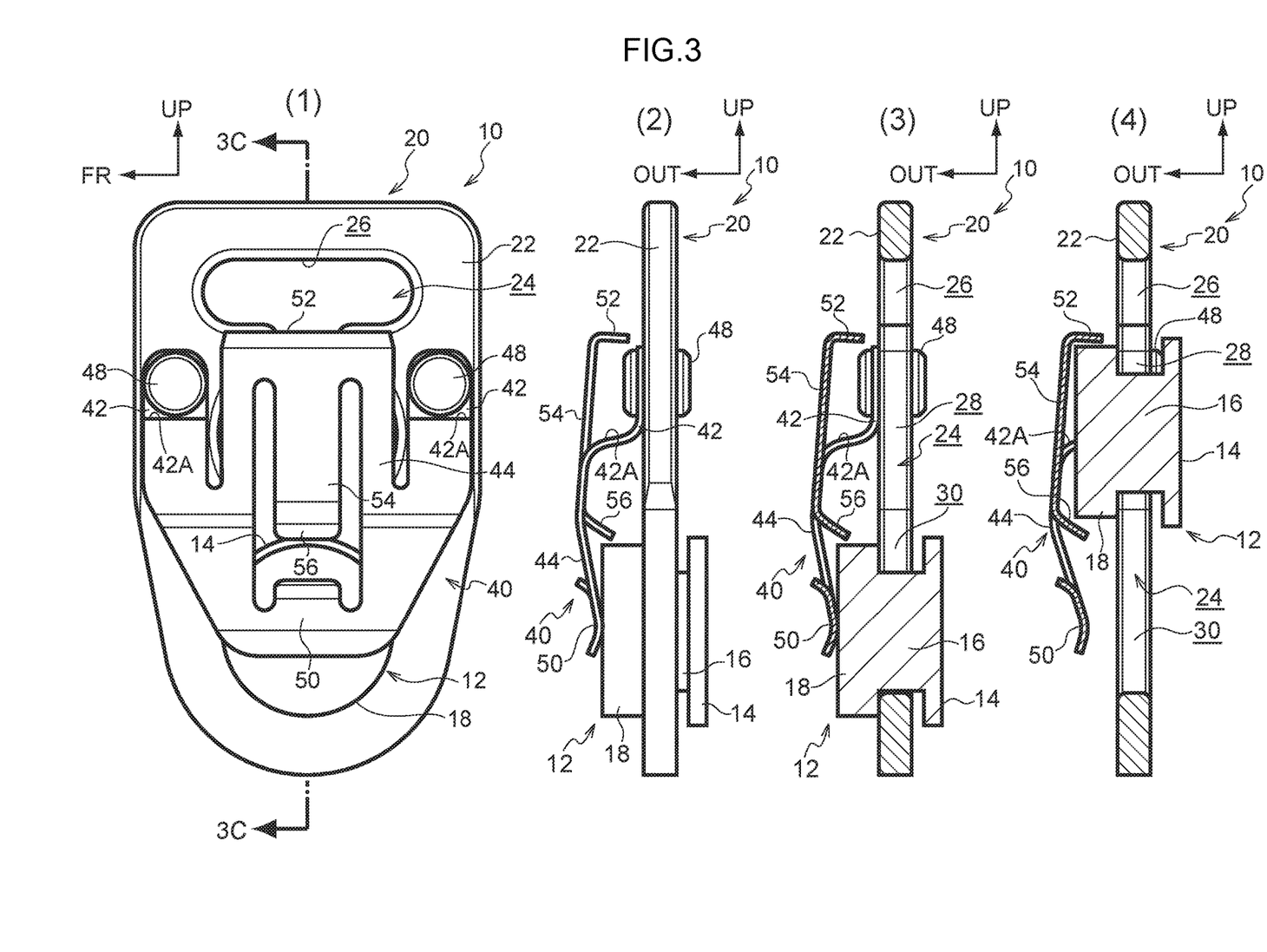

As shown in FIG. 1 and FIG. 2, the anchor device 10 includes a mounting pin 12 serving as a second member. The mounting pin 12 is, for example, entirely made of a metal such as iron and is disposed at the vehicle lower side of one vehicle width direction side portion of a seat cushion (not shown in the drawings) of the front seat. Furthermore, the mounting pin 12 includes a base portion 14, a small diameter portion 16, and a large diameter portion 18.

The base portion 14 is discoid in shape (or cylindrical in shape), and the direction of the central axis of the base portion 14 lies along the vehicle width direction. The vehicle width direction inner end of the base portion 14 is connected to a vehicle body (not shown in the drawings) such as a frame that configures the seat cushion portion of the front seat, and the base portion 14 is integrated with the vehicle body.

The small diameter portion 16 is provided at the vehicle width direction outer side of the base portion 14. The small diameter portion 16 is cylindrical in shape, and the outer diameter dimension of the small diameter portion 16 is smaller than the outer diameter dimension of the base portion 14. The direction of the central axis of the small diameter portion 16 lies along the vehicle width direction, and the small diameter portion 16 is disposed coaxially with the base portion 14. The vehicle width direction inner end of the small diameter portion 16 is connected to the vehicle width direction outer end of the base portion 14, and the small diameter portion 16 is integrated with the base portion 14.

The large diameter portion 18 is provided at the vehicle width direction outer side of the small diameter portion 16. The large diameter portion 18 is cylindrical in shape (or discoid in shape), and the outer diameter dimension of the large diameter portion 18 is larger than the outer diameter dimension of the small diameter portion 16. The direction of the central axis of the large diameter portion 18 lies along the vehicle width direction, and the large diameter portion 18 is disposed coaxially with the small diameter portion 16. The vehicle width direction inner end of the large diameter portion 18 is connected to the vehicle width direction outer end of the small diameter portion 16, and the large diameter portion 18 is integrated with the small diameter portion 16.

The anchor device 10 also includes a plate 20 (an anchor plate). The plate 20 includes a tabular plate body 22 serving as a first member. In FIG. 3(1) the anchor device 10 is shown in a front view seen from its vehicle width direction outer side, in FIG. 3(2) the anchor device 10 is shown in a side view seen from its vehicle rear side, and in FIG. 3(3) and FIG. 3(4) the anchor device 10 is shown in sectional views taken along line 3C-3C of FIG. 3(1). It will be noted that FIG. 3(4) shows a state in which the mounting pin 12 is disposed in an insertion position in the plate 20.

The plate body 22 is, for example, made of a metal such as iron and formed in the shape of a substantially rectangular plate overall, and one lengthwise direction side portion of the plate body 22 is substantially semicircular in front view. Furthermore, the thickness dimension (vehicle width direction dimension) of the plate body 22 is smaller than the axial direction dimension (vehicle width direction dimension) of the small diameter portion 16 of the mounting pin 12. In this embodiment, the width direction of the plate body 22 lies along the vehicle front and rear direction, the lengthwise direction of the plate body 22 lies along the vehicle up and down direction, and one lengthwise direction side (the substantially semicircular side in front view) portion of the plate body 22 is on the vehicle lower side.

A communication hole 24 serving as a through hole is formed in the plate body 22, and the communication hole 24 is configured by a webbing pass-through portion 26 serving as a coupling portion and a pin insertion portion 28 serving as an insertion portion. Furthermore, a pin anchoring portion 30 that configures holding means is provided at the plate body 22. The pin anchoring portion 30 communicates with the pin insertion portion 28 and is formed in the plate body 22.

The webbing pass-through portion 26 that configures the communication hole 24 is disposed in the vehicle upper portion of the plate body 22, and the webbing pass-through portion 26 is a long hole long in the vehicle front and rear direction (the width direction of the plate body 22) and penetrates the plate body 22 in the thickness direction thereof.

The lengthwise direction distal end portion of a long belt-like webbing 32 is passed through the inside of the webbing pass-through portion 26, and the webbing 32 configures the seat belt device together with the anchor device 10. The lengthwise direction distal end portion of the webbing 32 is passed through the inside of the webbing pass-through portion 26 from the vehicle upper side of the webbing pass-through portion 26 and is looped back in the vehicle upward direction. The portion of the webbing 32 on the lengthwise direction distal end side of this looped-back portion is overlaid, in the thickness direction of the webbing 32, on the portion of the webbing 32 on the lengthwise direction basal end side of the looped-back portion and is secured by sewing, for example, to the portion of the webbing 32 on the lengthwise direction basal end side of the looped-back portion. Because of this, the lengthwise direction distal end portion of the webbing 32 is anchored (coupled) to the plate 20.

Furthermore, the seat belt device includes a buckle (not shown in the drawings), and the buckle is provided at the vehicle width direction other side of the front seat. In a state in which the occupant is seated in a seated position in the front seat, the webbing 32 pulled out from a spool of a webbing take-up device is placed around an occupant's body, and in this state a tongue (not shown in the drawings)

provided at the webbing 32 is engaged with the buckle. Because of this, the webbing 32 is worn on the occupant's body, and the occupant's body can be restrained by the webbing 32.

The pin insertion portion 28 that configures the communication hole 24 in the plate body 22 together with the webbing pass-through portion 26 is formed through the plate body 22 on the vehicle lower side of the webbing pass-through portion 26, and the pin insertion portion 28 is continuous with the webbing pass-through portion 26. The inner peripheral shape of the pin insertion portion 28 is larger than the outer peripheral shape of the large diameter portion 18 of the mounting pin 12. For this reason, the large diameter portion 18 of the mounting pin 12 can be inserted into the pin insertion portion 28 from the vehicle width direction inner side of the plate body 22, and the small diameter portion 16 of the mounting pin 12 can be disposed inside the pin insertion portion 28 (in the insertion position) (see FIG. 3(4)).

Moreover, the pin anchoring portion 30 that communicates with the webbing pass-through portion 26 in the communication hole 24 is formed through the plate body 22 on the vehicle lower side of the pin insertion portion 28. Furthermore, the pin anchoring portion 30 extends in the vehicle up and down direction and is continuous with the pin insertion portion 28, and its vehicle lower end portion is semicircular in front view. The vehicle front and rear direction dimension (width dimension) of the pin anchoring portion 30 is slightly larger than the outer diameter dimension of the small diameter portion 16 of the mounting pin 12 and is smaller than the outer diameter dimensions of both the base portion 14 and the large diameter portion 18 of the mounting pin 12.

For this reason, when the plate 20 (the plate body 22) is moved (slid) in the vehicle upward direction in a state in which the small diameter portion 16 of the mounting pin 12 is disposed inside the pin insertion portion 28 of the communication hole 24, the small diameter portion 16 is moved (slid) and becomes fitted in the vehicle lower portion of the pin anchoring portion 30. At the same time, the vehicle width direction outer surface of the base portion 14 of the mounting pin 12 is brought into opposition with the vehicle width direction inner surface of the plate body 22 on the side of the pin anchoring portion 30, and the vehicle width direction inner surface of the large diameter portion 18 of the mounting pin 12 is brought into opposition with the vehicle width direction outer surface of the plate body 22 on the side of the pin anchoring portion 30 (see FIG. 1 and FIG. 3(1) to FIG. 3(3)).

Figure 4A:
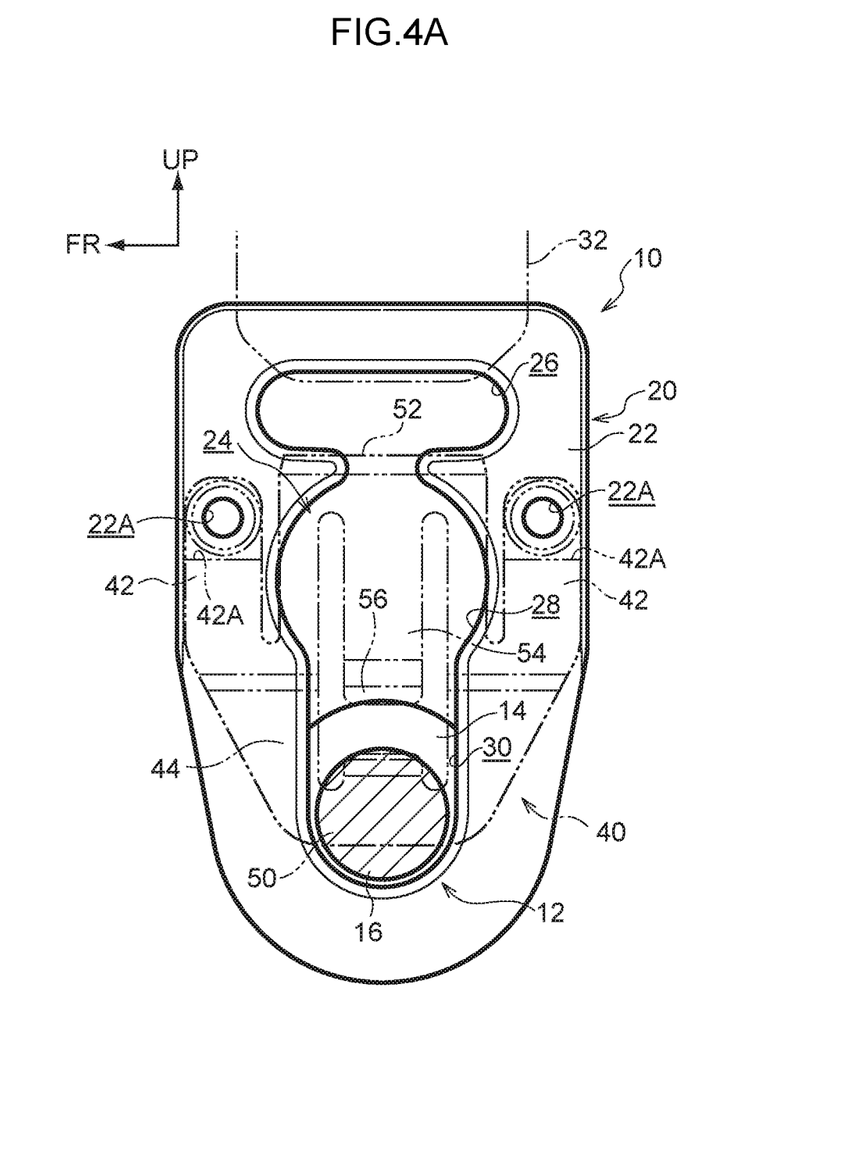
FIG. 4A is a front view of a plate body and shows a state before the plate body is subjected to a tensile load.

In the plate 20, because the mounting pin 12 is disposed in the pin anchoring portion 30 of the plate body 22, movement of the plate body 22 in the vehicle upward direction is limited by the mounting pin 12 (see FIG. 4A).

Here, in the plate 20, a narrowing portion 34 serving as a limiting portion is provided at the communication hole 24 in the plate body 22, and the narrowing portion 34 is formed between the webbing pass-through portion 26 and the pin insertion portion 28. The narrowing portion 34 includes a pair of projections 36, and the projections 36 extend in directions toward each other from both sides of the peripheral edge portion of the communication hole 24 (both width direction sides of the plate body 22) between the webbing pass-through portion 26 and the pin insertion portion 28. Because of this, the width of communication between the webbing pass-through portion 26 and the pin insertion portion 28 in the communication hole 24 is narrowed, so that the vehicle lower peripheral edge of the webbing pass-through portion 26 is substantially linear and the vehicle upper peripheral edge of the pin insertion portion 28 is substantially arcuate.

Figure 4B:
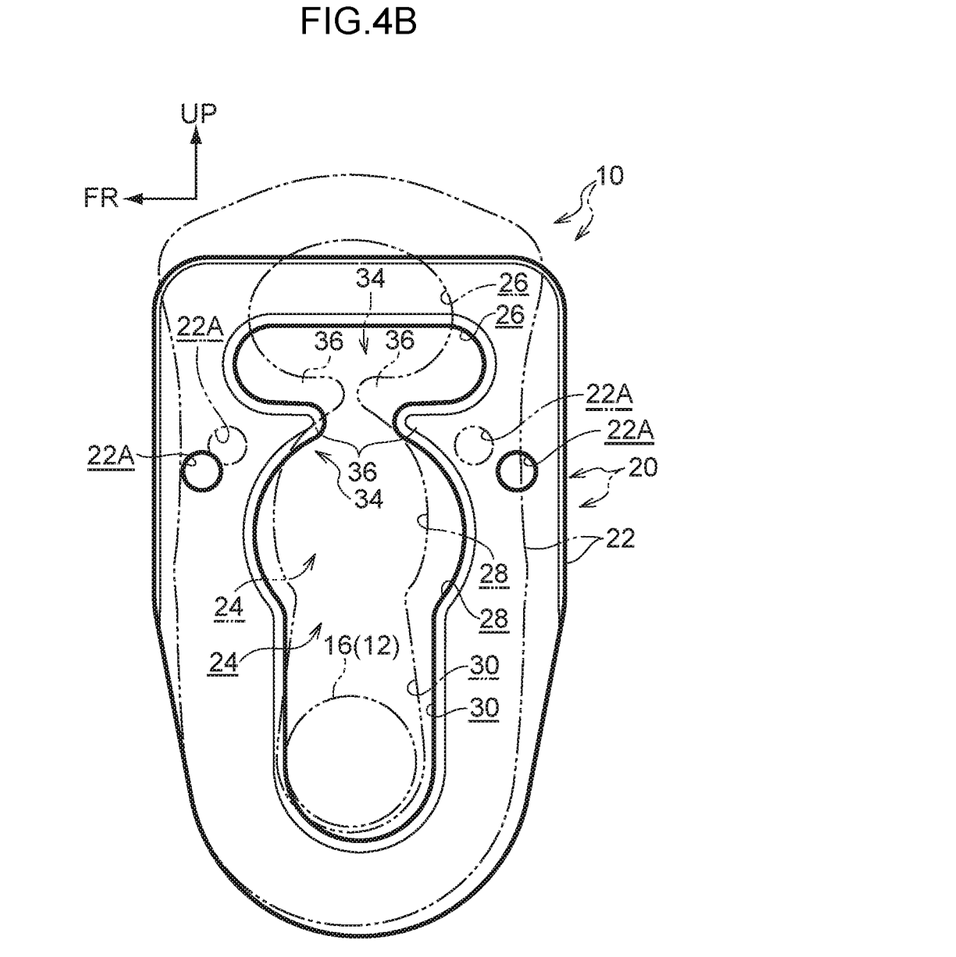
FIG. 4B is a front view of the plate body and shows a state in which the plate body is being subjected to a tensile load.

The distal end portions of the pair of projections 36 oppose each other across a predetermined distance dimension, and the distance dimension between the mutual distal ends of the pair of projections 36 is smaller than the outer diameter dimension of the small diameter portion 16 of the mounting pin 12. Furthermore, when the plate body 22 is subjected to a tensile load in the vehicle upward direction and becomes deformed, the distance between the distal end portions of the pair of projections 36 is further reduced (see FIG. 4B). The distance between the distal end portions of the pair of projections 36 is configured to be a distance where the distal ends of the projections 36 abut against each other before the deformation of the plate body 22 reaches an elastic limit.

On the vehicle width direction outer side of the plate body 22 is provided a spring plate 40 serving as a biasing member (biasing means) that configures holding means. The spring plate 40 is made of metal, and the spring plate 40 includes a pair of leg portions 42 and a body portion 44. The leg portions 42 are each substantially strip-like in shape, and the lengthwise directions of each coincide with the vehicle up and down direction. One of the leg portions 42 is disposed at the vehicle front side of the body portion 44, and the other is disposed at the vehicle rear side. In the spring plate 40, the body portion 44 is coupled to and integrated with the vehicle lower portions (basal end portions) of each of the leg portions 42.

Each of the leg portions 42 includes a securing hole 46, and the securing holes 46 are formed through the vehicle upper portions (distal end portions) of the leg portions 42 (see FIG. 2). Furthermore, mounting holes 22A are formed through the plate body 22, on both sides of the communication hole 24 (the pin insertion portion 28), in portions of the plate body 22 on the vehicle lower side of the narrowing portion 34 that serves as an intermediate portion in the communication direction of the communication hole 24 (see FIG. 2).

The spring plate 40 is secured to the plate body 22 by rivets 48 inserted through each of the securing holes 46 into each of the mounting holes 22A in the plate body 22, with the securing holes 46 in the leg portions 42 being on the vehicle upper side. Because of this, the spring plate 40 is mounted to the plate body 22 on the vehicle width direction outer side of the plate body 22, and the body portion 44 is disposed so as to cover the pin insertion portion 28 and the pin anchoring portion 30 of the communication hole 24. Furthermore, the spring plate 40 is coupled, to the plate body 22 on both sides of the communication hole 24, substantially in the shape of a "U" that is convex in the opposite direction of the webbing 32 because of the pair of leg portions 42 and the body portion 44.

Lengthwise direction intermediate portions of each of the leg portions 42 are configured as erect portions 42A, so that the basal end portion sides (vehicle lower sides) of each of the leg portions 42 are erect outward in the vehicle width direction. Because of this, the body portion 44 of the spring plate 40 is disposed apart from the plate body 22 outward in the vehicle width direction, so that the large diameter portion 18 of the mounting pin 12 can be disposed between the body portion 44 and the plate body 22.

The outer peripheral portion of the body portion 44 of the spring plate 40 is frame-like in shape. The vehicle lower portion (lower frame portion, extension distal end portion) of the body portion 44 is configured to serve as a biasing portion 50, and when the small diameter portion 16 of the mounting pin 12 is disposed inside the pin anchoring portion 30 of the plate body 22, the biasing portion 50 opposes the vehicle width direction outer surface of the large diameter portion 18 of the mounting pin 12.

The body portion 44 is bent, in the neighborhood of the portions thereof coupled to the leg portions 42, in such a way that the biasing portion 50 side thereof approaches the plate body 22. Furthermore, each of the vehicle lower edge portion and the vehicle upper edge portion of the biasing portion 50 are bent in directions away from the plate body 22.

When the small diameter portion 16 of the mounting pin 12 is moved from the inside of the pin insertion portion 28 of the plate body 22 to the inside of the pin anchoring portion 30, the biasing portion 50 of the spring plate 40 becomes elastically tilted outward in the vehicle width direction by the large diameter portion 18 of the mounting pin 12, and the large diameter portion 18 becomes sandwiched and held between the biasing portion 50 and the plate body 22. For this reason, when the small diameter portion 16 is disposed inside the pin anchoring portion 30, the biasing force of the spring plate 40 brings the biasing portion 50 into pressure-contact with the vehicle width direction outer surface of the large diameter portion 18 and brings the vehicle width direction outer surface of the plate body 22 into pressure-contact with the vehicle width direction inner surface of the large diameter portion 18, whereby movement of the plate body 22 in the vehicle width direction is limited.

The body portion 44 of the spring plate 40 includes a limiting wall 52 serving as a limiting portion. The limiting wall 52 is formed as a result of the vehicle upper end portion of the body portion 44 being bent toward the plate body 22 at the portion of the plate body 22 between the webbing pass-through portion 26 and the pin insertion portion 28 (in the neighborhood of the narrowing portion 34). Because of this, the limiting wall 52 is disposed across the communication hole 24 in the width direction of the plate body 22.

Furthermore, the body portion 44 includes a rectangular tilting piece 54 inside. The tilting piece 54 is coupled to the inside of the vehicle upper portion of the substantially frame-like body portion 44 and extends in the vehicle downward direction from the coupled portion on the vehicle upper side. Furthermore, the tilting piece 54 is bent toward the plate body 22 in the neighborhood of the biasing portion 50 (the portion of the pin anchoring portion 30 on the pin insertion portion 28 side), and the bent distal end portion of the tilting piece 54 is configured to serve as a pin limiting portion 56.

In the mounting pin 12, when the small diameter portion 16 is disposed inside the pin insertion portion 28 of the plate body 22, the large diameter portion 18 is disposed between the limiting wall 52 and the pin limiting portion 56 of the spring plate 40. Furthermore, when the small diameter portion 16 of the mounting pin 12 is moved from the inside of the pin insertion portion 28 to the inside of the pin anchoring portion 30, the distal end of the pin limiting portion 56 abuts against the vehicle width direction outer surface of the large diameter portion 18 of the mounting pin 12 so that the tilting piece 54 is tilted and lifted up. Moreover, when the small diameter portion 16 of the mounting pin 12 has been fitted inside the pin anchoring portion 30 of the plate body 22, the pin limiting portion 56 on the distal end of the tilting piece 54 comes off the vehicle width direction outer surface of the large diameter portion 18, and the tilted state of the tilting piece 54 returns to what it was before (is restored).

For this reason, when the small diameter portion 16 of the mounting pin 12 has been fitted inside the pin anchoring portion 30, the pin limiting portion 56 is disposed at the vehicle upper side of the large diameter portion 18. Because of this, movement of the large diameter portion 18 in the vehicle upward direction relative to the plate body 22 is limited by the pin limiting portion 56.

Furthermore, when the small diameter portion 16 of the mounting pin 12 is fitted in the pin anchoring portion 30 of the plate body 22, the biasing portion 50 of the body portion 44 abuts against the vehicle width direction outer surface of the large diameter portion 18 of the mounting pin 12. For this reason, in the spring plate 40, the body portion 44 is tilted with the portions thereof coupled to the leg portions 42 acting as a fulcrum, and the distal end of the limiting wall 52 on the opposite side of the biasing portion 50 is brought closer to the vehicle width direction outer surface of the plate body 22. Because of this, the distance between the limiting wall 52 and the plate body 22 is reduced.

Next, a work process for anchoring the lengthwise direction distal end portion of the webbing 32 to the vehicle body (the mounting pin 12) using the anchor device 10 will be described as the action of this embodiment.

In the anchor device 10, as described above, the lengthwise direction distal end portion of the webbing 32 is anchored beforehand to the webbing pass-through portion 26 of the communication hole 24 in the plate body 22. Furthermore, the spring plate 40 is mounted on the vehicle width direction outer side of the plate body 22. Moreover, the mounting pin 12 is mounted beforehand to the vehicle lower portion of the seat cushion of the front seat in the vehicle body.

The plate 20 is moved toward the mounting pin 12 from the vehicle width direction outer side of the mounting pin 12, and the large diameter portion 18 of the mounting pin 12 goes through the pin insertion portion 28 of the communication hole 24 in the plate body 22 relatively from the vehicle width direction inner side of the plate body 22 and becomes disposed at the vehicle width direction outer side of the plate body 22. In this state, the large diameter portion 18 of the mounting pin 12 penetrates the pin insertion portion 28, and the small diameter portion 16 of the mounting pin 12 is disposed inside the pin insertion portion 28 (in the insertion position; see FIG. 3(4)).

Next, when the plate 20 is moved (slid) in the vehicle upward direction in the state in which the small diameter portion 16 of the mounting pin 12 is disposed inside the pin insertion portion 28, the small diameter portion 16 of the mounting pin 12 is moved from the communication hole 24 of the plate body 22, and the small diameter portion 16 is disposed inside the pin anchoring portion 30 (see FIG. 3(1) to FIG. 3(3)). Because of this, movement of the small diameter portion 16 of the mounting pin 12 in the vehicle downward direction and in the vehicle front and rear direction is limited by the peripheral edge portion of the pin anchoring portion 30, and the mounting pin 12 is fitted in the plate body 22 (a holding position).

Here, the plate body 22 is provided with the communication hole 24 in which the webbing pass-through portion 26 and the pin insertion portion 28 communicate with each other. For this reason, the distance between the webbing pass-through portion 26 and the pin insertion portion 28 in the vehicle up and down direction can be reduced, the plate 20 can be miniaturized in the vehicle up and down direction, and the anchor device 10 can be miniaturized in the vehicle up and down direction.

In the communication hole 24 in the plate body 22, the narrowing portion 34 is provided between the webbing pass-through portion 26 and the pin insertion portion 28, and the narrowing portion 34 narrows the width of communication between the webbing pass-through portion 26 and the pin insertion portion 28. For this reason, when the large diameter portion 18 of the mounting pin 12 is passed through the pin insertion portion 28 of the plate body 22, the large diameter portion 18 of the mounting pin 12 is blocked from entering the webbing pass-through portion 26, so the large diameter portion 18 of the mounting pin 12 can be easily inserted into the pin insertion portion 28.

Furthermore, the narrowing portion 34 can limit movement of the small diameter portion 16 of the mounting pin 12 inserted inside the pin insertion portion 28 toward the webbing pass-through portion 26 and movement of the webbing 32 passed through the webbing pass-through portion 26 toward the pin insertion portion 28. Because of this, in the anchor device 10, the large diameter portion 18 of the mounting pin 12 can be inhibited from contacting the webbing 32 passed through the webbing pass-through portion 26.

Furthermore, the spring plate 40 is mounted to the plate body 22, and the limiting wall 52 of the spring plate 40 is disposed at the vehicle width direction outer side of the plate body 22. For this reason, the webbing 32 passed through the webbing pass-through portion 26 is limited from moving toward the pin insertion portion 28 of the plate body 22. Because of this, in the anchor device 10, the large diameter portion 18 of the mounting pin 12 can be effectively inhibited from contacting the webbing 32 passed through the webbing pass-through portion 26 of the plate body 22. Moreover, because the body portion 44 of the spring plate 40 is provided so as to cover the vehicle width direction outer side of the plate body 22, the large diameter portion 18 of the mounting pin 12 can be inhibited even more effectively from contacting the webbing 32. Furthermore, because the pair of projections 36 are provided between the webbing pass-through portion 26 and the pin insertion portion 28, even if deflection arises in the webbing 32 passed through the webbing pass-through portion 26, the webbing 32 can be limited even more from entering the pin insertion portion 28, and the webbing 32 can be limited even more effectively from contacting the large diameter portion 18 of the mounting pin 12.

Moreover, because the body portion 44 of the spring plate 40 covers the vehicle width direction outer side of the plate body 22, the body portion 44 of the spring plate 40 limits movement of the plate body 22 inward in the vehicle width direction when the mounting pin 12 is passed through the pin insertion portion 28 of the plate body 22. Because of this, it becomes easy to dispose the small diameter portion 16 of the mounting pin 12 inside the pin insertion portion 28, and it becomes easy to assemble the mounting pin 12 and the plate 20 to each other, so the assemblability of the plate 20 and the mounting pin 12 can be improved.

Furthermore, when the small diameter portion 16 of the mounting pin 12 has been disposed inside the pin anchoring portion 30 of the plate body 22, the biasing portion 50 of the spring plate 40 abuts against the vehicle width direction outer side of the large diameter portion 18 of the mounting pin 12, and the large diameter portion 18 of the mounting pin 12 is pressed inward in the vehicle width direction by the biasing force of the spring plate 40.

For this reason, movement of the large diameter portion 18 of the mounting pin 12 in the vehicle width direction is limited by the biasing force of the spring plate 40. Because of this, the mounting pin 12 is appropriately held in the plate 20 (the plate 20 is appropriately held on the mounting pin 12) as a result of the small diameter portion 16 of the mounting pin 12 being disposed inside the pin anchoring portion 30. Moreover, the mounting pin 12 can be held in the plate 20 in a state in which the large diameter portion 18 of the mounting pin 12 is sandwiched and held between the biasing portion 50 of the spring plate 40 and the plate body 22. Because of this, relative movement (vibration) between the plate 20 and the mounting pin 12 caused by the action of external force such as vibration of the vehicle can be inhibited, so the generation of noise by the plate 20 and the mounting pin 12 can be inhibited.

Furthermore, the pin limiting portion 56 of the tilting piece 54 is disposed at the vehicle upper side of the large diameter portion 18 of the mounting pin 12 as a result of the small diameter portion 16 of the mounting pin 12 moving from the inside of the pin insertion portion 28 of the plate body 22 to the inside of the pin anchoring portion 30. Because of this, movement of the large diameter portion 18 of the mounting pin 12 in the vehicle upward direction is limited, the small diameter portion 16 of the mounting pin 12 can be effectively limited from moving from the inside of the pin anchoring portion 30 to the inside of the pin insertion portion 28, and the mounting pin 12 can be even more appropriately held in the plate 20.

Moreover, when the biasing portion 50 of the spring plate 40 (the body portion 44) abuts against the vehicle width direction outer surface of the large diameter portion 18 of the mounting pin, the biasing portion 50 is lifted up by the large diameter portion 18 of the mounting pin 12. For this reason, in the spring plate 40, the body portion 44 is tilted with the portions thereof coupled to the leg portions 42 acting as a fulcrum, whereby the distal end of the limiting wall 52 is brought closer to the vehicle width direction outer surface of the plate body 22, and the distance between the limiting wall 52 and the plate body 22 is reduced. Because of this, even if slack arises in the webbing 32 passed through the webbing pass-through portion 26 of the plate body 22, the webbing 32 can be inhibited from going between the limiting wall 52 and the plate body 22, and the webbing 32 can be inhibited from ending up getting caught between the limiting wall 52 and the plate body 22.

When the occupant's body tries to move in the vehicle forward direction, the plate body 22 becomes subjected to a tensile load in the vehicle upward direction due to the webbing 32 that is restraining the occupant's body. When the plate body 22 is subjected to the tensile load in the vehicle upward direction, the communication hole 24 deforms and the plate body 22 deforms, whereby the tensile load is absorbed. At this time, the plate body 22 deforms in a direction in which the mounting holes 22A formed across the communication hole 24 move toward each other (see FIG. 4B).

Here, the spring plate 40 is substantially in the shape of a "U" that is convex in the opposite direction of the webbing 32, and is secured to the mounting holes 22A on both sides of the communication hole 24 in the plate body 22. Moreover, the erect portions 42A are provided at the leg portions 42 of the spring plate 40. For this reason, when the plate body 22 is subjected to the tensile load from the webbing 32, a situation where the spring plate 40 mounted to the plate body 22 impedes deformation of the plate body 22 can be effectively inhibited.

Furthermore, when the plate body 22 deforms, the distal ends of the pair of projections 36 move toward each other, but the deformation of the plate body 22 is limited as a result of the distal ends of the projections 36 abutting against each other. Because of this, the deformation of the plate body 22 can be effectively limited by the pair of projections 36, and the plate body 22 can be inhibited from ending up being plastically deformed by the tensile load to which it is subjected by the webbing 32.

It will be noted that in this embodiment the lengthwise direction distal end portion of the webbing 32 is anchored to the plate body 22. However, the buckle of the seat belt device may be the webbing side, with the buckle being indirectly anchored to the plate body 22 via the webbing 32.

Furthermore, the anchor device 10 pertaining to this embodiment is applied to a seat belt device for a front seat in a vehicle. However, the anchor device may be applied to a seat belt device for a rear seat in a vehicle, and the anchor device may be applied to a seat belt device for any seat in a vehicle.

The disclosure of Japanese Patent Application No. 2019-053425 filed on Mar. 20, 2019, is incorporated in its entirety herein by reference.

The invention claimed is:

1. An anchor device comprising:
a first member through which is formed a communication hole in which a webbing pass-through portion and an insertion portion communicate with each other, the first member being coupled to a webbing passed through the webbing pass-through portion;
a second member that is coupled to a vehicle body, that is inserted into the insertion portion, and that penetrates the first member; and
a limiting portion that is provided between the webbing pass-through portion and the insertion portion, and that limits the second member and the webbing from moving toward each other,
wherein the limiting portion includes a narrowing portion that narrows a width of communication between the webbing pass-through portion and the insertion portion in the communication hole, the narrowing portion including a pair of projections that project into the communication hole toward each other, and
wherein a distance between mutual distal ends of the pair of projections is smaller than a width of the webbing passed through the webbing pass-through portion.

2. An anchor device comprising:
a first member through which is formed a communication hole in which a webbing pass-through portion and an insertion portion communicate with each other, the first member being coupled to a webbing passed through the webbing pass-through portion;
a second member that is coupled to a vehicle body, that is inserted into the insertion portion, and that penetrates the first member; and
a limiting portion that is provided between the webbing pass-through portion and the insertion portion, and that limits the second member and the webbing from moving toward each other,
wherein the limiting portion includes a limiting wall disposed at an insertion direction side of the second member between the webbing pass-through portion and the insertion portion of the first member.

3. The anchor device of claim 2, further comprising a biasing member that is mounted on the first member, and that biases the second member so that the second member is held in the first member.

4. The anchor device of claim 3, wherein the limiting portion is provided at the biasing member.

5. The anchor device of claim 4, wherein the distance between the limiting portion and the first member is reduced as a result of the biasing member biasing the second member.

* * * * *